United States Patent
Ikeda et al.

(10) Patent No.: US 8,867,179 B2
(45) Date of Patent: *Oct. 21, 2014

(54) POWER SOURCE VOLTAGE PROTECTIVE DEVICE AND POWER SOURCE VOLTAGE PROTECTION METHOD

(75) Inventors: Atsushi Ikeda, Tochigi (JP); Nobuchika Ochi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 459 days.

This patent is subject to a terminal disclaimer.

(21) Appl. No.: 13/075,340

(22) Filed: Mar. 30, 2011

(65) Prior Publication Data

US 2011/0242709 A1 Oct. 6, 2011

(30) Foreign Application Priority Data

Mar. 31, 2010 (JP) ................................ 2010-081178

(51) Int. Cl.
*H02H 7/00* (2006.01)
*B60L 3/00* (2006.01)
*H02J 7/14* (2006.01)
*H02J 7/00* (2006.01)

(52) U.S. Cl.
CPC ............ *B60L 3/0046* (2013.01); *Y02T 10/7005* (2013.01); *Y02T 10/7055* (2013.01); *H02J 7/1461* (2013.01); *H02J 7/0026* (2013.01)
USPC .......................................................... 361/18

(58) Field of Classification Search
USPC ............................... 361/18; 341/118, 120, 155
See application file for complete search history.

(56) References Cited

U.S. PATENT DOCUMENTS

2011/0057724 A1* 3/2011 Pabon ........................... 327/581

FOREIGN PATENT DOCUMENTS

| JP | 11-103522 | 4/1999 |
| JP | 2005-326313 | 11/2005 |
| JP | 2009-239769 | 10/2009 |

OTHER PUBLICATIONS

Japanese Office Action dated Jul. 30, 2013, 2 pages.

* cited by examiner

*Primary Examiner* — Ronald W Leja
(74) *Attorney, Agent, or Firm* — Rankin, Hill & Clark LLP

(57) ABSTRACT

A microcomputer is equipped with a CPU and an AD converter. The AD converter is supplied with the same power source voltage as the CPU, and converts a reference voltage into digital data using the received power source voltage and outputs the digital data as a conversion value. The CPU detects a state of the power source voltage by calculating a voltage variation of a power source voltage for ordinary operation on the basis of a first conversion value obtained by AD-converting the reference voltage by the AD converter in a state that a standard power source voltage including no voltage variation is supplied to the AD converter and a second conversion value obtained by AD-converting the reference voltage by the AD converter in a state that the power source voltage for ordinary operation is supplied to the AD converter.

5 Claims, 5 Drawing Sheets

POWER SOURCE VOLTAGE PROTECTIVE DEVICE AND POWER SOURCE VOLTAGE PROTECTION METHOD

BACKGROUND OF THE INVENTION

1. Field of the Invention

The present invention relates to a power source voltage protective device and a power source voltage protection method for detecting a state of a power source voltage that is supplied to a CPU, a microcomputer, or the like.

2. Related Art

Abnormal reduction or increase of a power source voltage that is supplied to a CPU, a microcomputer, or the like may cause trouble in operation of the CPU, the microcomputer, or the like. In view of this, conventionally, methods for detecting a state of a power source voltage supplied to such a device have been proposed (refer to Patent documents 1 and 2, for example).

Patent document 1: JP-A-2009-239769
Patent document 2: JP-A-11-103522

In the device disclosed in Patent document 1, a power source voltage and a reference voltage are input to an AD conversion device and reduction of the power source voltage is detected by comparing data obtained by AD-converting the reference voltage using the power source voltage and data obtained by AD-converting the power source voltage using the reference voltage. The power circuit disclosed in Patent document 2 performs protection processing of detecting reduction of a power source voltage by comparing a reference voltage obtained by multiplying the power source voltage by a prescribed coefficient with a voltage that is separately input from outside.

In the above-described methods, in order to detect a state of a power source voltage, a voltage other than the power source voltage is compared with the power source voltage. For example, in the device of Patent document 1, AD-converted data of a power source voltage and a reference voltage are compared with each other. In the circuit of Patent document 2, a reference voltage and a separately input voltage are compared with each other (voltage values are compared with each other). However, in configurations in which a power source voltage and a comparison subject voltage are compared with each other, either the power source voltage being higher than the comparison subject voltage or the power source voltage being lower than the comparison subject voltage can only be judged. For example, the configurations of Patent documents 1 and 2 enable detection of an abnormality that the power source voltage is too low, they are unable to detect an abnormality that the power source voltage is too high. To detect both of such abnormalities by the conventional methods, it is necessary to use many comparison subject voltages. That is, more voltages of different systems need to be input to an AD conversion device, a microcomputer, or the like, which causes problems such as complication of a circuit configuration and resulting cost increase.

SUMMARY OF THE INVENTION

One or more embodiments of the present invention provide a power source voltage protective device and a power source voltage protection method which can detect, in a detailed manner, a state of a power source voltage that is supplied to a CPU, a microcomputer, or the like.

In accordance with one or more embodiments of the invention, a power source voltage protective device 10 in which a state of a power source voltage Vcc supplied to a protection subject circuit unit 13 is detected is provided with: an AD converting section 15 to which the power source voltage Vcc is supplied, and which is adapted to convert a reference voltage Vref into a digital data Xref using the received power source voltage Vcc and to output the digital data Xref, wherein the power source voltage Vcc is commonly supplied to the protection subject circuit unit 13 and the AD converting section 15; and a power source monitoring section 13 adapted to detect the state of the power source voltage Vcc of an ordinary operation by calculating a voltage variation ΔVcc of the power source voltage Vcc based on a first conversion value Xref_ideal obtained by AD-converting the reference voltage Vref by the AD converting section 15 in a state that a standard power source voltage including no voltage variation is supplied to the AD converting section and a second conversion value Xref_real obtained by AD-converting the reference voltage Vref by the AD converting section 15 in a state that the power source voltage Vcc for the ordinary operation is supplied to the AD converting section 15.

Moreover, in accordance with one or more embodiments of the invention, a power source voltage protection method, for detecting a state of a power source voltage Vcc that is supplied to a protection subject circuit unit 13 by a power source voltage protective device 10 having an AD converting section 15 to which the power source voltage Vcc which is the same with the power source voltage Vcc supplied to the protection subject circuit unit 13 is supplied, is performed by: obtaining a first conversion value Xref_ideal by AD-converting a reference voltage Vref by the AD converting section 15 in a state that a standard power source voltage including no voltage variation is supplied to the AD converting section 15; obtaining a second conversion value Xref_real by AD-converting the reference voltage Vref by the AD converting section 15 in a state that the power source voltage for an ordinary operation is supplied to the AD converting section 15; and detecting a state of the power source voltage Vcc by calculating a voltage variation ΔVcc of a power source voltage Vcc for the ordinary operation based on a first conversion value Xref_ideal and the second conversion value Xref_real.

Other aspects and advantages of the invention will be apparent from the following description and the appended claims.

DETAILED DESCRIPTION OF THE EXEMPLARY EMBODIMENTS

An exemplary embodiment of the present invention will be hereinafter described with reference to the drawings.

Figure 1:
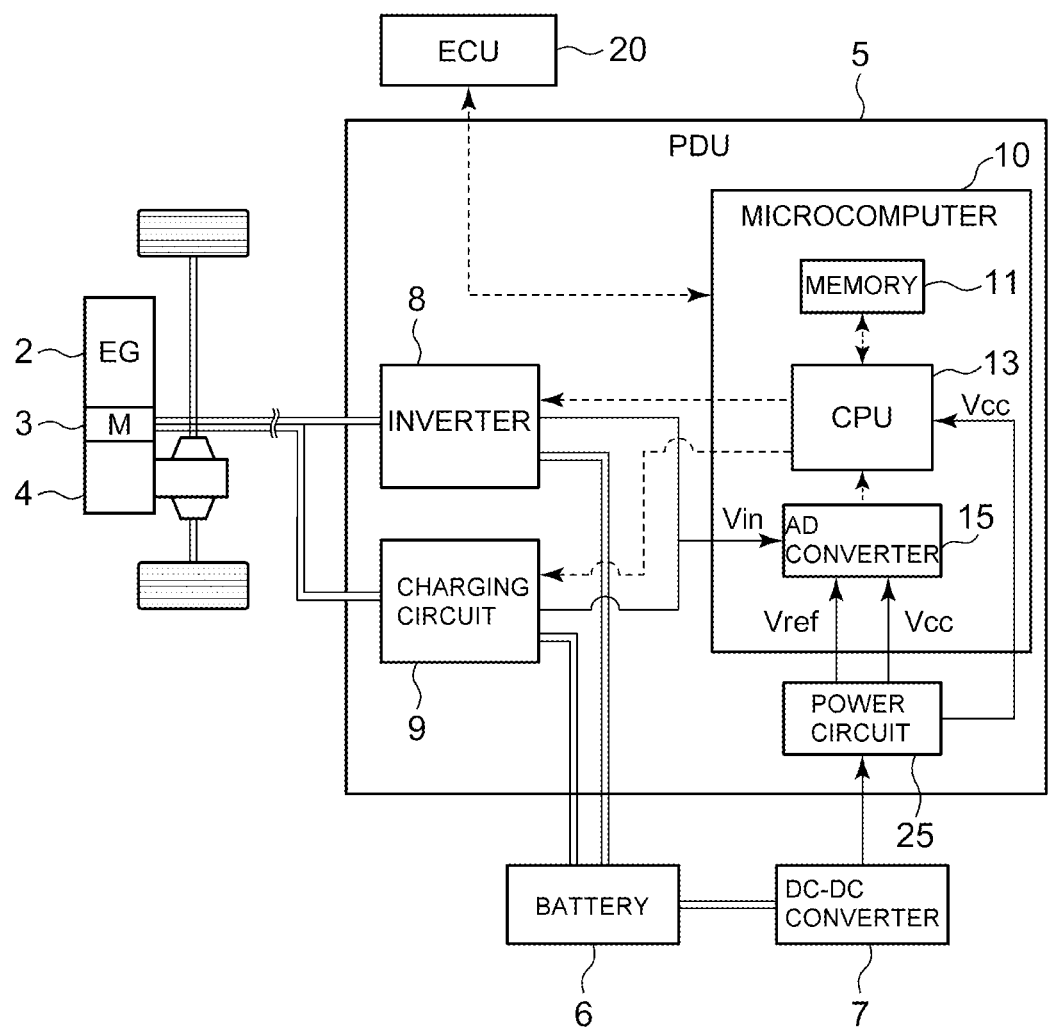
FIG. 1 is a block diagram showing a configuration of a FDU and its peripheral circuits of an exemplary embodiment.

FIG. 1 is a block diagram showing a general configuration of a hybrid car according to the exemplary embodiment. In FIG. 1, solid lines represent power supply lines and broken lines represent control signal lines.

The hybrid car shown in FIG. 1 is a car which runs with its axle driven by a driving system which is equipped with an engine 2, a motor 3, and an automatic transmission 4. The motor 3 is connected to a battery 6 via a PDU (Power Drive Unit) 5.

The motor 3 is driven by three-phase AC currents that are supplied from the PDU 5 (described later). The output shaft of the motor 3 is connected to the crank shaft of the engine 2. The motive power of the motor 3 starts the engine 2, and assists the drive power of the engine 2 while the car is running. During deceleration, for example, the motor 3 functions as a generator which regenerates electric energy from rotation energy of the crank shaft. The PDU 5 charges the battery using electric power thus generated by the motor 3.

A gear shift operation of the automatic transmission 4 is controlled in such a manner that plural synchronous clutches are driven being controlled through hydraulic controls by an ECU (Electric Control Unit) 20. Drive power of the engine 2 and the motor 3 is transmitted to the right and left drive wheels through the automatic transmission 4.

The PDU 5 is equipped with an inverter 8 for converting DC power that is supplied from the battery 6 into AC power, a charging circuit 9 for converting AC power generated by the motor 3 into DC power having a prescribed voltage through voltage transformation and rectification and charging the battery 6 by the thus-produced DC power, a microcomputer 10 for controlling the inverter 8 and the charging circuit 9 under the control of the ECU 20 of the car, and a power circuit 25 for supplying power to the microcomputer 10.

The inverter 8 incorporates a switching power circuit for converting DC power that is supplied from the battery 6 into three-phase (U, V, and W) AC power under the control of the microcomputer 10. With this configuration, the motive power of the motor 3 is PWM-controlled by the microcomputer 10.

The charging circuit 9 charges the battery 6 by outputting, to the battery 6, DC power produced by performing rectification and voltage transformation on power generated by the motor 3.

The battery 6 has plural secondary batteries such as nickel-hydrogen secondary batteries or lithium ion secondary batteries that are connected to each other in series and/or parallel, and is equipped with, among other circuits, a protective circuit for detecting a balance abnormality, an excessive discharge, excessive charging, etc. of each secondary battery by detecting the voltage across the two terminals of each secondary battery.

A DC-DC converter 7 for converting the voltage of DC power generated by discharge of the battery 6 is connected to the battery 6. For example, the DC-DC converter 7 lowers the voltage (100 V) of DC power that is output from the battery 6 to 12 V and supplies resulting power to control devices and auxiliary devices of the car. Also the microcomputer 10 of the PDU 5 is supplied with power from the DC-DC converter 7.

The microcomputer 10 (power source voltage protective device) is equipped with an AD converter 15 (AD converting section) for converting, into digital data, analog voltages to be monitored for pieces of control performed by the microcomputer 10 and outputting the thus-produced digital data, a CPU 13 (power source monitoring section) for controlling the inverter 8 and the charging circuit 9 on the basis of the digital data that are output from the AD converter 15, and a memory 11 (storage unit) for storing data etc. to be processed by the CPU 13. The power circuit 25, which is mounted on a board of the PDU 5 together with the microcomputer 10, is connected to the microcomputer 10 and supplies the microcomputer 10 with a power source voltage Vcc and a reference voltage Vref. The CPU 13 and the AD converter 15 of the microcomputer 10 operate on the power source voltage Vcc which is supplied from the power circuit 25, and the AD converter 15 performs AD conversion (described later) using, as a reference, the reference voltage Vref which is supplied from the power circuit 25. The following description will be made with an assumption that the resolution of the AD converter 15 is 10 bits (just an example).

The CPU 13 detects a state of the power source voltage Vcc that is supplied from the power circuit 25 to the CPU 13 and the AD converter 15 on the basis of digital data that is input from the AD converter 15, and performs an operation for protecting the microcomputer 10 if the power source voltage Vcc is higher or lower than a prescribed range.

The voltages to be monitored by the CPU 13 to control the inverter 8 and the charging circuit 9 are the input voltage that is input from the battery 6 to the inverter 8, the output voltage of the charging circuit 9 which is produced on the basis of power generated by the motor 3, and other voltages. As shown in FIG. 1, each of these voltages is input to the microcomputer 10 as an input voltage Vin and the AD converter 15 outputs digital data by quantizing the input voltage Vin. Each input voltage Vin that is input to the microcomputer 10 is not a monitoring subject voltage itself, that is, not the input voltage itself that is input from the battery 6 to the inverter 8 or the output voltage itself of the charging circuit 9 which is produced on the basis of power generated by the motor 3. Each monitoring subject voltage is input to the microcomputer 10 as an input voltage Vin after being voltage-divided by a voltage division circuit (not shown) provided outside the microcomputer 10 into a voltage that is within a rated range of the microcomputer 10.

The DC-DC converter 7 is connected to the battery 6. The DC-DC converter 7 lowers the voltage of DC power that is output from the battery 6 to 14 V (DC), which is supplied to individual units of the car. The power circuit 25 of the PDU 5 generates the power source voltage Vcc and the reference voltage Vref by smoothing and transforming the DC voltage that is input from the DC-DC converter 7.

Incidentally, the output voltage of the battery 6 varies depending on or due to the residual capacity of the battery 6, aging variations and a load variation the battery 6, the temperature of the battery 6, and other factors. The load variation of the battery 6 depends on the operation state of the motor 3 (i.e., whether the motor 3 is generating electric power through regeneration of energy or the car is being driven using power generated by the battery 6) and the operation states of auxiliary devices of the car such as the blower fan of an air conditioner. The temperature of the battery 6 not only becomes high during a discharge and charging but also is influenced by the ambient temperature of the car. For example, the temperature of the battery 6 may be below 0° C. when a cold start is done in a cold season, and reach 60° C. when the ambient temperature is high. As mentioned above, the battery 6 has secondary batteries such as nickel-hydrogen secondary batteries or lithium ion secondary batteries. In general, the charging/discharging efficiency of these kinds of secondary batteries lowers when their temperature is high. Therefore, the output voltage of the battery 6 is prone to be influenced by its temperature.

As described above, the output voltage of the battery 6 is prone to vary because its characteristics depend on its use conditions in the car and hence the power source voltage Vcc of the power circuit 25 which is supplied with power from the battery 6 is also varied by the above factors.

In view of the above, in the exemplary embodiment, to protect the protection subjects, that is, the CPU 13 and the microcomputer 10 which incorporates the CPU 13, the CPU 13 itself functions as a power source monitoring section and monitors a variation of the power source voltage Vcc which is supplied from the power circuit 25 on the basis of digital data that is output from the AD converter 15 which is supplied with the same power source voltage Vcc as the CPU 13 and data stored in the memory. Methods for realizing such monitoring will be described below.

A measurement subject voltage that is input to the AD converter 15 is called an input voltage Vin and a variable component of the power source voltage Vcc which is input to the AD converter 15 is called a voltage variation ΔVcc. As mentioned above, the resolution of the AD converter 15 is assumed to be 10 bits. The AD converter 15 converts an input voltage Vin into digital data with the power source voltage Vcc as a full scale of 10 bits, and outputs an AD conversion value X. The AD conversion value X is given by the following Equation (1'):

$$X = Vin \times 2^{10}/Vcc \quad (1')$$

Assume an example case that a power source voltage Vcc of +5 V is supplied from the power circuit 25 to the CPU 13 and the AD converter 15 and has a voltage variation ΔVcc of ±2% and an input voltage Vin of +3 V is input to the AD converter 15.

If it is assumed that the power source voltage Vcc has no voltage variation ΔVcc, an AD conversion value X of the input voltage Vin is calculated as 614 LSBs according to Equation (1'):

$$X = 3 \times 2^{10}/5 = 614 \text{ LSBs}$$

The voltage variation ΔVcc of 2% corresponds to 0.1 V. Therefore, a power source voltage Vcc for ordinary operation to be supplied actually ranges from 4.9 V to 5.1 V. AD conversion values X corresponding to the highest value and the lowest value of the power source voltage Vcc are calculated as follows according to Equation (1'):

$$X = 3 \times 2^{10}/5.1 = 602 \text{ LSBs}$$

$$X = 3 \times 2^{10}/4.9 = 626 \text{ LSBs}$$

The range of 602 to 626 LSBs corresponds to ±2%. In this manner, the AD conversion value varies linearly as the power source voltage Vcc varies. Based on this fact, in the exemplary embodiment, a voltage variation ΔVcc is determined on the basis of a variation of an AD conversion value of the AD converter 15.

Where the power source voltage Vcc in Equation (1') is a voltage that is supplied for ordinary operation, it includes a voltage variation ΔVcc and hence can be expressed as Vcc+ΔVcc. Therefore, an AD conversion value X in ordinary operation is given by the following Equation (1) which is a modified version of Equation (1'):

$$X = Vin \times 2^{10}/(Vcc + \Delta Vcc) \quad (1)$$

The voltage variation ΔVcc can take either of a positive value and a negative value.

In the microcomputer 10, an AD conversion value X (represented by Xref_ideal) that is obtained when the reference voltage Vref is measured by the AD converter 15 in a state that the AD converter 15 is supplied with a standard power source voltage Vcc with no voltage variation Vcc is stored in the memory 11 as a presetting.

The AD conversion value Xref_ideal may be determined by an actual measurement by connecting, to the AD converter 15, a constant voltage source that is so accurate as to be regarded as outputting an ideal power source voltage Vcc and supplying the AD converter 15 with a reference voltage Vref that is likewise highly accurate. Alternatively, the value Xref_ideal can be calculated from a specification of the power circuit 25 which supplies the power source voltage (Vcc) and the reference voltage Vref to the microcomputer 10. A standard voltage and a variation range of the output voltage of each of electronic components such as regulators constituting the power circuit 25 are prescribed in its specification. The value Xref_ideal can be calculated according to the following Equation (2) using, as the standard power source voltage Vcc and a standard reference voltage Vref in Equation (2), standard output voltage values of regulators that output the power source voltage (Vcc) and the reference voltage Vref, respectively. The AD conversion value Xref_ideal thus calculated corresponds to a first conversion value.

$$X\text{ref\_ideal} = Vref \times 2^{10}/Vcc \quad (2)$$

where $2^{10}$ (=1,024) is a decimal number corresponding to the resolution 10 bits of the AD converter 15.

After the presetting, a reference voltage Vref that is actually input from the power circuit 25 is measured by the AD converter 15. An AD conversion value Xref_real thus measured is given by the following Equation (3), and corresponds to a second conversion value.

$$X\text{ref\_real} = Vref \times 2^{10}/(Vcc + \Delta Vcc) \quad (3)$$

The CPU 13 compares the AD conversion value Xref_ideal corresponding to the standard power source voltage Vcc with the AD conversion value Xref_real that has been obtained with the supply of the ordinary power source voltage according to the following Equation (4) and calculates the voltage variation ΔVcc from Equation (4):

$$X\text{ref\_real}/X\text{ref\_ideal} = (Vcc + \Delta Vcc)/Vcc \quad (4)$$

Since the value of the standard power source voltage Vcc, that is, the value of Vcc in Equation (4), is known, a calculated value ΔVcc_calc of the voltage variation ΔVcc can be obtained according to the following Equation (5) which is a modified version of Equation (4):

$$\Delta Vcc\_calc \cong \Delta Vcc = Vcc \times \{X\text{ref\_real}/X\text{ref\_ideal} - 1\} \quad (5)$$

For the calculation according to Equation (5), values of Xref_real/Xref_ideal may be determined for plural combinations of a value Xref_real and a value Xref_ideal and stored in the memory 11 in the form of a map in advance. In this case, a value ΔVcc_calc can be determined quickly after acquisition of a value Xref_real and a value Xref_ideal, without the need for calculating Xref_real/Xref_ideal actually. The processing load can be reduced greatly and the processing speed and the operation efficiency of the microcomputer 10 can be increased.

Next, a description will be made of a process for detecting a state of the power source voltage (Vcc) by the microcomputer 10 in a state that the PDU 5 is actually incorporated in the car.

Figure 2:
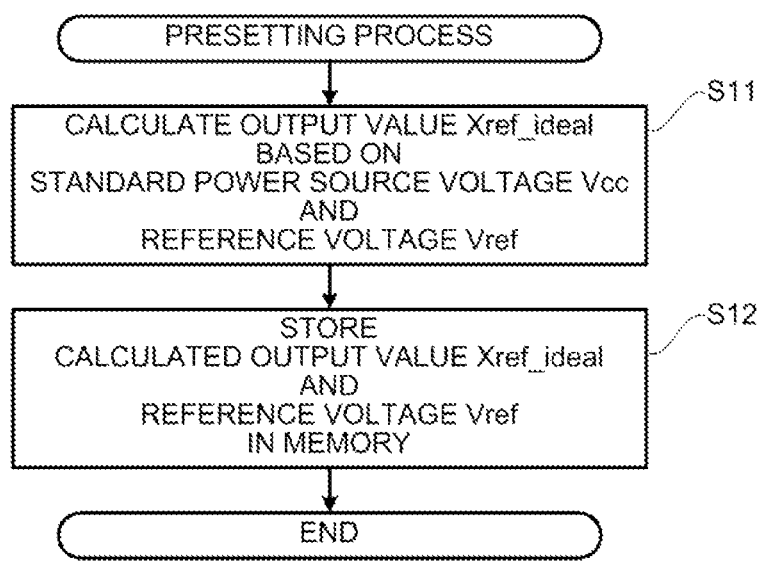
FIG. 2 is a flowchart of a presetting process.

FIG. 2 is a flowchart of a presetting process for setting necessary pieces of information in the microcomputer 10 in advance. In this presetting process, at step S11, an output value Xref_ideal of the AD converter 15 that should be obtained when the standard power source voltage Vcc and the standard reference voltage Vref are input to the microcomputer 10 is calculated on the basis of the specifications of components such as regulators that constitute the power circuit 25. At step S12, the calculated output value Xref_ideal and the reference voltage value Vref are stored in the memory 11. The output value Xref_ideal stored in the memory 11 will be used in the following calculation process.

Instead of executing the above-described presetting process, an output value Xref_ideal may be actually measured by the AD converter 15 in a state that a constant voltage source that is so accurate as to be regarded as outputting the ideal power source voltage Vcc is connected to the AD converter 15 of the microcomputer 10 and the standard power source voltage Vcc (the ideal power source voltage) is supplied from this constant voltage source to the AD converter 15 and a reference voltage Vref that is likewise highly accurate is also supplied to the AD converter 15. In this case, a measurement value Xref_ideal thus measured and the reference voltage value Vref are stored in the memory 11 so as to be correlated with each other.

As a result of the execution of the presetting process, the memory 11 is stored with the AD conversion value Xref_ideal and the reference voltage Vref which are necessary for the calculation of Equations (3)-(5).

Figure 3:
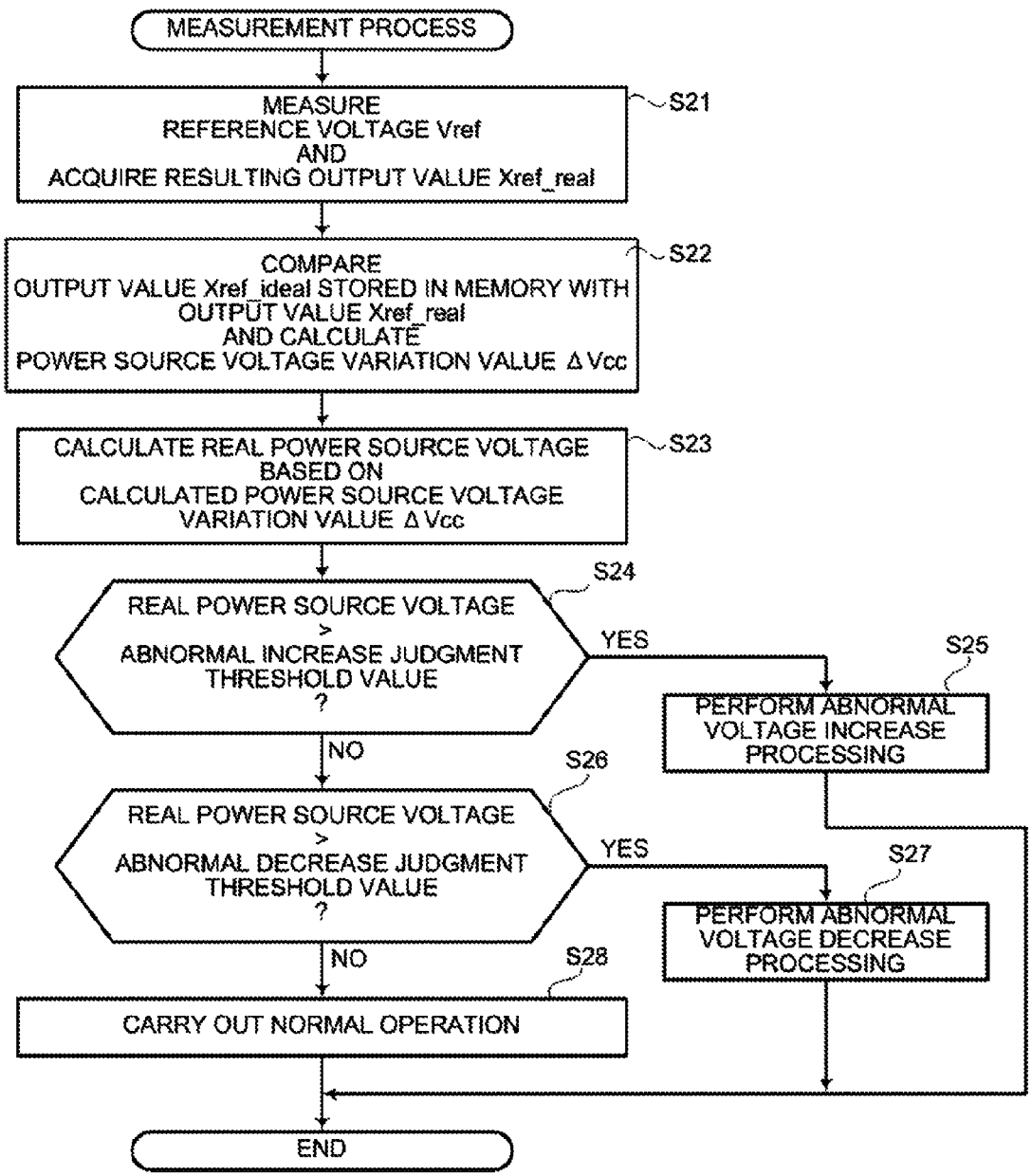
FIG. 3 is a flowchart of a voltage measurement process.

FIG. 3 is a flowchart of a measurement process that the AD converter 15 of the microcomputer 10 measures an analog voltage value actually. This process is executed in a state that the power source voltage (Vcc) and the reference voltage Vref are being supplied to the microcomputer 10 from the power circuit 25 (see FIG. 1).

First, at step S21, the AD converter 15 measures the reference voltage Vref under the control of the CPU 13 and the CPU 13 acquires a resulting AD conversion value Xref_real.

At step S22, the CPU 13 compares the AD conversion value Xref_ideal that was stored in the memory 11 in the presetting process with the AD conversion value Xref_real that was output from the AD converter 15 at step S21, and calculates a voltage variation ΔVcc_calc according to Equations (3)-(5).

At step S23, the CPU 13 calculates a power source voltage for ordinary operation that should be supplied actually on the basis of the calculated voltage variation ΔVcc_calc and the standard power source voltage Vcc. Then, the CPU 13 judges whether or not the calculated power source voltage is within a normal range. That is, at step S24, the CPU 13 judges whether or not the calculated power source voltage is larger than an abnormal increase judgment threshold value that is stored in the memory 11 in advance. If the power source voltage is larger than the abnormal increase judgment threshold value (S24: yes), the CPU 13 judges that the power source voltage has increased beyond the normal range and performs processing for coping with the abnormal voltage increase at step S25. More specifically, if the power source voltage has increased beyond the normal range, the CPU 13 causes the power circuit 25 to suspend the supply of the power source voltage and causes a backup power source (not shown) of another system to supply a power source voltage. The CPU 13 also causes a display device, an on-board indicator, an alarm sound output device, or the like connected to the ECU 20 to raise the alarm.

On the other hand, if the power source voltage is smaller than or equal to the abnormal increase judgment threshold value (S24: no), the CPU 13 judges at step S26 whether or not the calculated power source voltage is smaller than or equal to an abnormal decrease judgment threshold value that is stored in the memory 11 in advance. If the calculated power source voltage is smaller than or equal to the abnormal decrease judgment threshold value (S26: yes), the CPU 13 judges that the power source voltage has decreased so as to go out of the normal range and performs processing for coping with the abnormal voltage decrease at step S27. More specifically, if the power source voltage has decreased so as to go out of the normal range, the CPU 13 causes the power circuit 25 to suspend the supply of the power source voltage and causes the backup power source (not shown) of another system to supply a power source voltage. The CPU 13 also causes the display device, the on-board indicator, the alarm sound output device, or the like connected to the ECU 20 to raise the alarm, and puts the microcomputer 10 and the ECU 20 in escape states in which they can perform minimum functions.

If the calculated power source voltage is lager than abnormal decrease judgment threshold value (S26: no), since the power source voltage is in the normal range, the CPU 13 causes the power circuit 25 to continue its operation.

The measurement process of FIG. 3 is executed every preset time.

Figure 4:
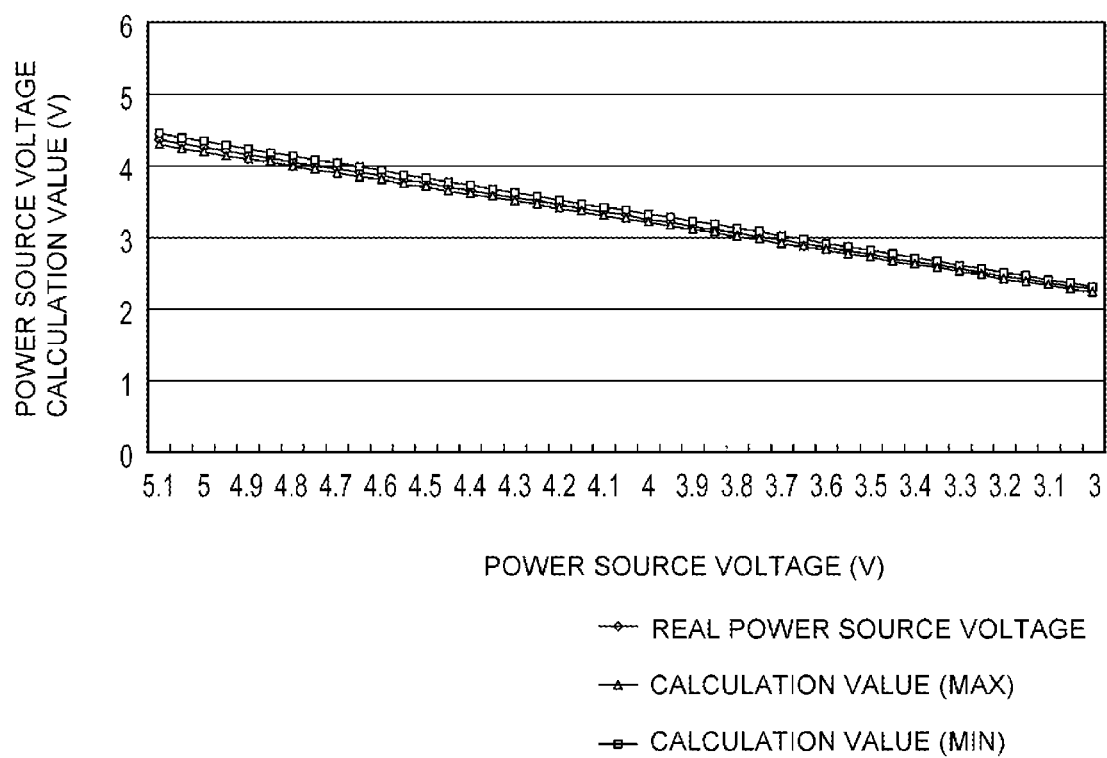
FIG. 4 is a graph showing power source voltage calculation values.
Figure 5:
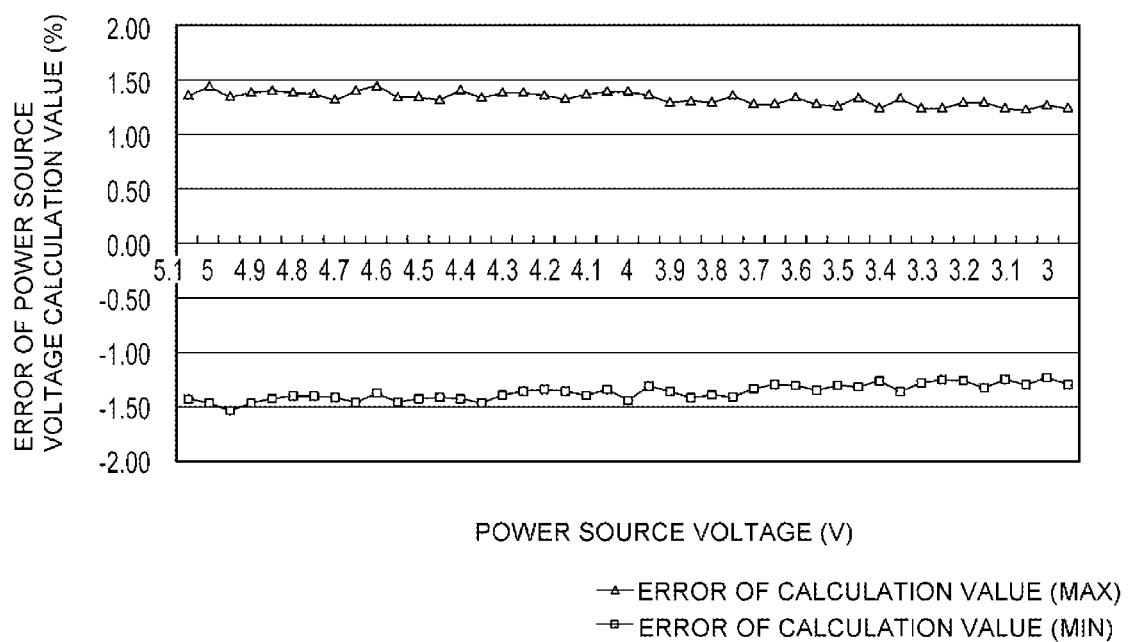
FIG. 5 is a graph showing errors of power source voltage calculation values.

FIG. 4 is a graph showing a relationship between the real power source voltage and the calculated value Vcc_calc in a specific example in which power source voltage calculation values Vcc_calc were calculated by the above-described method. FIG. 5 is a graph showing a relationship between the real power source voltage and the error (%) of the calculated value Vcc_calc. In FIGS. 4 and 5, the horizontal axis represents the real power source voltage (V). A maximum value (max) and a minimum value (min) of power source voltage calculation values Vcc_calc calculated by the above-described method and their errors are shown in FIGS. 4 and 5.

As seen from FIGS. 4 and 5, when the power source voltage is in the range of 3 to 5 V, the error of the power source voltage calculation value Vcc_calc from the real power source voltage is approximately constant and is within ±1.5%. Therefore, the error is within 0.1 V for power source voltages around +5 V, which means that power source voltages can be calculated very accurately.

As described above, the microcomputer 10 according to the exemplary embodiment which detects a state of a power source voltage that is supplied to the CPU 13 is equipped with the CPU 13 and the AD converter 15. The AD converter 15 is supplied with the same power source voltage as the CPU 13, and converts a reference voltage Vref into digital data using the received power source voltage and outputs the digital data as a conversion value. The CPU 13 detects a state of the power source voltage by calculating a voltage variation ΔVcc of a power source voltage for ordinary operation on the basis of an AD conversion value Xref_ideal obtained by AD-converting the reference voltage Vref by the AD converter 15 in a state that a standard power source voltage Vcc including no voltage variation ΔVcc is supplied to the AD converter 15 and an AD conversion value Xref_real obtained by AD-converting the reference voltage by the AD converter 15 in a state that the power source voltage for ordinary operation is supplied to the AD converter 15. Therefore, a state of a power source voltage can be detected by calculating a voltage variation ΔVcc of the power source voltage for ordinary operation in a detailed manner, that is, items detected are not limited to a magnitude relationship between the power source voltage and a comparison subject voltage value.

The microcomputer 10 is equipped with the memory 11 for storing the AD conversion value Xref_ideal in advance. The CPU 13 calculates a voltage variation ΔVcc of the power source voltage for ordinary operation on the basis of the AD conversion value Xref_ideal stored in the memory 11 and the AD conversion value Xref_real obtained by AD-converting the reference voltage Vref by the AD converter 15 in the state that the power source voltage for ordinary operation is supplied to the AD converter 15. Therefore, a voltage variation ΔVcc of a power source voltage can be detected in a state that only the power source voltage and the reference voltage Vref are applied to the AD converter 15. A voltage variation ΔVcc can be calculated as soon as an AD conversion value Xref_real is obtained. As a result, a state of a power source voltage can be detected in a detailed manner without causing complication of the circuit configuration.

The CPU 13 calculates, according to Equation (5) (Equation (A)), a voltage variation ΔVcc of the power source voltage for ordinary operation on the basis of the AD conversion value Xref_ideal obtained by AD-converting the reference voltage Vref by the AD converter 15 in the state that the standard power source voltage Vcc is supplied to the AD converter 15 and the AD conversion value Xref_real obtained by AD-converting the reference voltage Vref by the AD converter 15 in the state that the power source voltage for ordinary operation is supplied to the AD converter 15:

$$\Delta Vcc = Vcc \times \{Xref\_real/Xref\_ideal - 1\} \quad (5)$$

Therefore, a state of a power source voltage can be detected quickly in a detailed manner by performing a calculation that is light in processing load on the basis of two conversion values obtained by the AD converter 15 through AD conversion.

The AD conversion value Xref_ideal may be a conversion value calculated on the basis of characteristics of a power circuit for supplying the power source voltage and the reference voltage Vref to the AD converter 15 and characteristics such as a resolution of the AD converter 15. In this case, an AD conversion voltage Xref_ideal that should be obtained in a state that the ideal, standard voltage source voltage Vcc including no voltage variation is supplied to the AD converter 15 can easily be determined without using a high-accuracy power circuit and a voltage variation ΔVcc of a power source voltage can be calculated quickly and more accurately.

The microcomputer 10 which is incorporated in the hybrid car is used in such a state that the power source voltage Vcc that is supplied from the battery 6 to the AD converter is prone to vary depending on the environments of various units including the battery 6 and the operation states of various loads including the motor 3. As described above, since the CPU 13 can detect, reliably in a detailed manner, a variation of the power source voltage Vcc for the microcomputer 10, individual units including the CPU 13 can be protected from a voltage variation. Since a voltage variation ΔVcc is calculated using an AD conversion value Xref_ideal that is stored in the memory 11 in advance, it is not necessary to connect, to the AD converter 15 incorporated in a car, a high-accuracy standard voltage source that produces a power source voltage having a smaller variation than one to be supplied to the AD converter 15 during an ordinary operation. Therefore, the accuracy of AD conversion can be increased without complicating the device configuration.

The exemplary embodiment is directed to the case that a power source voltage Vcc which is input to the CPU 13 as a protection subject is monitored on the basis of a conversion value of the AD converter 15 by processing of the CPU 13 itself to protect the CPU 13 and the microcomputer 10 from a variation of the power source voltage Vcc, that is, the power source voltage protective device is the same as the protection subject circuit unit. However, the invention is not limited to such a case. The power source voltage protective device may be provided separately from the protection subject circuit unit. More specifically, a configuration is possible in which an AD converter and a CPU are provided separately from a protection subject circuit unit and the AD converter is supplied with the same power source voltage Vcc as the protection subject circuit unit. The CPU monitors a variation of the power source voltage Vcc by performing a calculation on the basis of digital data that is output from the AD converter.

Although the exemplary embodiment assumes that the resolution of the AD converter 15 is 10 bits, the invention is not limited to such a case. The resolution of the AD converter 15 may naturally be 8 bits, 16 bits, or some other value, and can be changed arbitrarily like the other specifications of the microcomputer 10. Although in the exemplary embodiment a voltage variation ΔVcc is calculated on the basis of a conversion value obtained by the AD converter 15's converting the reference voltage Vref which is always supplied to the AD converter 15 and a conversion value that is stored in the memory 11, the invention is not limited to such a case. For example, a reference voltage Vref for that purpose may be input to the AD converter 15 only when necessary or input to the AD converter 15 from the CPU 13. The values of the power source voltage Vcc and the reference voltage Vref can be changed arbitrarily according to the specification of the microcomputer 10. Although in the exemplary embodiment the CPU 13 detects a state of a power supply voltage Vcc which is supplied to individual units, including the CPU 13, of the microcomputer 10 is detected on the basis of a conversion value of the AD converter 15, the invention is not limited to such a case. For example, a configuration is possible in which an external power source voltage protective device is connected to the microcomputer 10 and detects a state of a power supply voltage Vcc for the microcomputer 10 by performing the above-described processing. A further configuration is possible in which the ECU 20 is a protection subject circuit and the microcomputer 10 detects a state of a power supply voltage for the ECU 20. The protection subject circuit(s) is not limited to the CPU 13 and the AD converter 15 of the microcomputer 10, and may be any circuit as long as it is a circuit that performs a control operation or calculation processing while being supplied with an external power source voltage and whose function is influenced by increase or decrease of the power source voltage. The range of the power source voltage is not limited to the range exemplified in the exemplary embodiment. The connection forms of the inverter 8, the charging circuit 9, and the microcomputer 10 and the detailed configuration of circuits etc. for supplying power from the battery 6 to the microcomputer 10 can be changed arbitrarily without departing from the spirit and scope of the invention. Although the exemplary embodiment is directed to the case that the invention is applied to the microcomputer 10 that is incorporated in the hybrid car, the invention is not limited to such a case. For example, the invention can also be applied to electric vehicles (EVs) and fuel cell vehicles (FCVs) as well as non-four-wheel vehicles in which a motor is driven by power that is supplied from a battery such as motorcycles and special vehicles.

The application range of the invention is not restricted to vehicles, and the invention can be applied to various apparatus as long as they incorporate a circuit unit such as a microcomputer or a CPU that operates receiving a power source voltage and protect that circuit unit from a variation of the power source voltage. In particular, it is preferable to apply the invention to movable bodies or apparatus that incorporate a battery and in which a driving motive power source such as a motor is driven by power supplied from the battery and a protection subject circuit incorporated therein is supplied with power from the same battery as the driving motive power source is, because the power source voltage for the protection subject circuit is prone to vary depending on the operation state of the driving motive power source and the invention enables protection from a variation of the power source voltage reliably. It is more effective to apply the invention to such movable bodies or apparatus in which, in addition, the battery is charged by generated or regenerated power, because there are more factors that vary the power source voltage.

According to the embodiments of the invention, a power source voltage protective device 10 in which a state of a power source voltage Vcc supplied to a protection subject circuit unit 13 is detected may include: an AD converting section 15 to which the power source voltage Vcc is supplied, and which is adapted to convert a reference voltage Vref into a digital data Xref using the received power source voltage Vcc and to output the digital data Xref, wherein the power source voltage Vcc is commonly supplied to the protection subject circuit unit 13 and the AD converting section 15; and a power source monitoring section 13 adapted to detect the state of the power source voltage Vcc of an ordinary operation by calculating a voltage variation ΔVcc of the power source voltage Vcc based on a first conversion value Xref_ideal obtained by AD-converting the reference voltage Vref by the AD converting section 15 in a state that a standard power source voltage including no voltage variation is supplied to the AD converting section and a second conversion value Xref_real obtained by AD-converting the reference voltage Vref by the AD converting section 15 in a state that the power source voltage Vcc for the ordinary operation is supplied to the AD converting section 15.

In this structure, a voltage variation itself of a power source voltage for ordinary operation is calculated on the basis of a first conversion value obtained by AD-converting the reference voltage in a state that a standard power source voltage including no voltage variation is supplied to the AD converting section and a second conversion value obtained by AD-converting the reference voltage in a state that the power source voltage for ordinary operation is supplied to the AD converting section. Therefore, a state of a power source voltage which is supplied to the protection subject circuit unit can be detected in a detailed manner, that is, items detected are not limited to a magnitude relationship between the power source voltage and a comparison subject voltage value.

In the above structure, the power source voltage protective device may further includes a storage unit 11 adapted to store the first conversion value Xref_ideal in advance. The power source monitoring section 13 may be adapted to calculate the voltage variation Vcc of the power source voltage Vcc for the ordinary operation based on of the first conversion value Xref_ideal stored in the storage unit 11 and the second conversion value Xref_real obtained by AD-converting the reference voltage Vcc by the AD converting section 15 in the state that the power source voltage Vcc for the ordinary operation is supplied to the AD converting section 15.

In this configuration, since a first conversion value is stored and a voltage variation of a power source voltage for ordinary operation is calculated on the basis of the stored first conversion value and the second conversion value obtained by AD-converting the reference voltage by the AD converting section which is supplied with the power source voltage for ordinary operation, a voltage variation can be calculated as soon as a second conversion value is obtained by the AD converting section. As a result, a state of a power source voltage which is supplied to the protection subject circuit unit can be detected quickly in a detailed manner without causing complication of the circuit configuration.

In the above structure, the power source monitoring section may be adapted to calculate the voltage variation based on an Equation: $\Delta Vcc = Vcc \times \{Xref\_real/Xref\_ideal - 1\}$.

In this configuration, a state of a power source voltage can be quickly detected in a detailed manner by performing a calculation that is light in processing load on the basis of two conversion values obtained by the AD converting section through AD conversion.

In the above structure, the first conversion value Xref_ideal may be a conversion value calculated based on characteristics of a power circuit 25 adapted to supply the power source voltage Vcc and the reference voltage Vref to the AD converting section 15 and characteristics of the AD converting section 15.

In this configuration, the power source voltage protective device can easily determine, without using a high-accuracy power circuit, a first conversion voltage that should be obtained in a state that the ideal, standard voltage source voltage including no voltage variation is supplied to the AD converting section, and can calculate a voltage variation of a power source voltage quickly and more accurately.

Moreover, according to the embodiments, a power source voltage protection method for detecting a state of a power source voltage Vcc that is supplied to a protection subject circuit unit 13 by a power source voltage protective device 10 having an AD converting section 15 to which the power source voltage Vcc which is the same with the power source voltage Vcc supplied to the protection subject circuit unit 13 is supplied may be performed by: obtaining a first conversion value Xref_ideal by AD-converting a reference voltage Vref by the AD converting section 15 in a state that a standard power source voltage including no voltage variation is supplied to the AD converting section 15; obtaining a second conversion value Xref_real by AD-converting the reference voltage Vref by the AD converting section 15 in a state that the power source voltage for an ordinary operation is supplied to the AD converting section 15; and detecting a state of the power source voltage Vcc by calculating a voltage variation ΔVcc of a power source voltage Vcc for the ordinary operation based on a first conversion value Xref_ideal and the second conversion value Xref_real.

In the above method, a voltage variation itself of a power source voltage for ordinary operation is calculated on the basis of a first conversion value obtained by AD-converting the reference voltage in a state that a standard power source voltage including no voltage variation is supplied to the AD converting section and a second conversion value obtained by AD-converting the reference voltage in a state that the power source voltage for ordinary operation is supplied to the AD converting section. Therefore, a state of a power source voltage can be detected in a detailed manner, that is, items detected are not limited to a magnitude relationship between the power source voltage and a comparison subject voltage value.

DESCRIPTION OF REFERENCE NUMERALS AND SIGNS

3: Motor
5: PDU
6: Battery
7: DC-DC converter
8: Inverter
9: Charging circuit
10: Microcomputer (power source voltage protective device)
11: Memory (Storage unit)
13: CPU (power source monitoring section)
15: AD converter (AD converting section)
25: Power circuit

What is claimed is:

1. A power source voltage protective device in which a state of a power source voltage supplied to a protection subject circuit unit is detected, the power source voltage protective device comprising:

an AD converting section to which the power source voltage is supplied, said AD converting section being adapted to convert a reference voltage into a digital data using the received power source voltage and to output the digital data, wherein the power source voltage is supplied to both the protection subject circuit unit and the AD converting section; and a power source monitoring section adapted to detect the state of the power source voltage by calculating a voltage variation of the power source voltage based on a first conversion value and a second conversion value, wherein said first conversion value is obtained by AD-converting the reference voltage by the AD converting section in an ideal state in which a standard power source voltage including no voltage variation is supplied to the AD converting section, and wherein said second conversion value is obtained by AD-converting the reference voltage by the AD converting section in a real state in which the power source voltage including voltage variation is supplied to the AD converting section.

2. The power source voltage protective device according to claim 1, further comprising:

a storage unit adapted to store the first conversion value in advance, wherein the power source monitoring section is adapted to calculate the voltage variation of the power source voltage for the ordinary operation based on of the first conversion value stored in the storage unit and the second conversion value.

3. The power source voltage protective device according to claim 1, wherein the power source monitoring section is adapted to calculate the voltage variation based on an Equation:

$$\Delta Vcc = Vcc \times \{Xref\_real / Xref\_ideal - 1\}$$

wherein the voltage variation is $\Delta Vcc$, the power source voltage is $Vcc$, the basis of the first conversion value is $Xref\_ideal$, and the second conversion value is $Xref\_real$.

4. The power source voltage protective device according to claim 1, wherein the first conversion value is a conversion value calculated based on characteristics of a power circuit adapted to supply the power source voltage and the reference voltage to the AD converting section and characteristics of the AD converting section.

5. A power source voltage protection method for detecting a state of a power source voltage that is supplied to a protection subject circuit unit by a power source voltage protective device having an AD converting section to which the power source voltage that is the same with the power source voltage supplied to the protection subject circuit unit is supplied, the method comprising:

obtaining a first conversion value of AD-converting a reference voltage by the AD converting section in an ideal in which a standard power source voltage including no voltage variation is supplied to the AD converting section;

obtaining a second conversion value of AD-converting the reference voltage by the AD converting section in a real state in which the power source voltage including voltage variation is supplied to the AD converting section; and detecting a state of the power source voltage by calculating a voltage variation of a power source voltage based on a first conversion value and the second conversion value.

* * * * *